J. H. KELLY & J. H. MERSHON.
BLADE.
APPLICATION FILED DEC. 14, 1911.

1,067,347.

Patented July 15, 1913.

Witnesses

Inventors
J. H. Kelly
J. H. Mershon

By
A. W. Stacey, Attorney.

UNITED STATES PATENT OFFICE.

JOHN H. KELLY, OF STANTON, AND JOHN H. MERSHON, OF VAN ALSTYNE, TEXAS.

BLADE.

1,067,347.

Specification of Letters Patent.

Patented July 15, 1913.

Application filed December 14, 1911. Serial No. 665,719.

*To all whom it may concern:*

Be it known that we, JOHN H. KELLY and JOHN H. MERSHON, citizens of the United States, residing at Stanton and Van Alstyne, in the counties of Martin and Grayson, respectively, and State of Texas, have invented certain new and useful Improvements in Blades, of which the following is a specification.

This invention has relation to weed blades adapted to be attached to a cultivator, and has for its object to provide a blade of simple structure adapted to be applied to the rear side of the point or moldboard of the cultivator with an edge portion which projects beyond the edge of the same.

For a full understanding of the invention reference is to be had to the following description and accompanying drawing, in which:—

Figure 1:
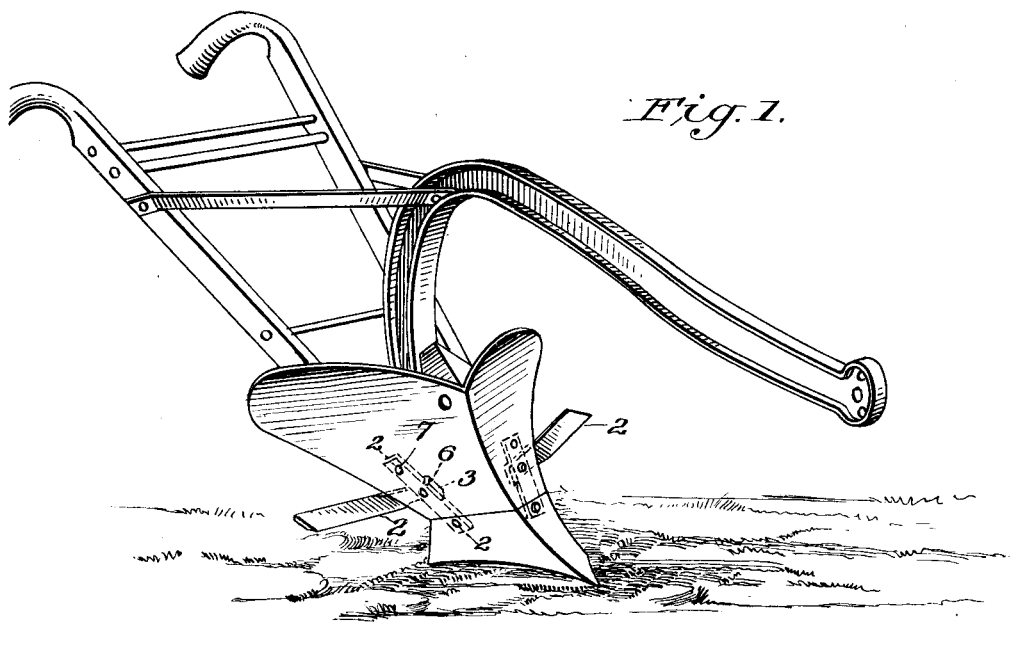
Figure 2:
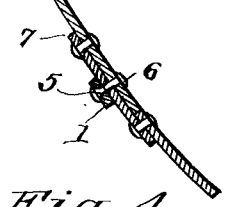
Figure 3:
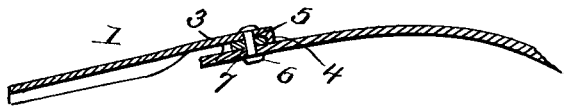
Figure 4:
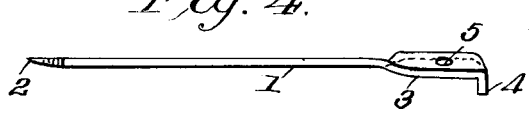
Figure 5:
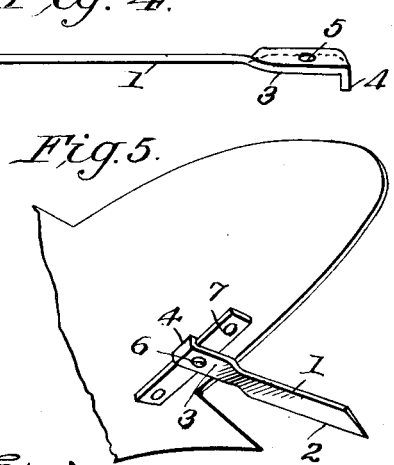

Figure 1 is a perspective view of a middle burster with the blades attached; Fig. 2 is a transverse sectional view through a moldboard and share and a blade attached thereto; Fig. 3 is a horizontal sectional view of the same; Fig. 4 is an edge elevation of one form of the blade; Fig. 5 is a rear view of parts of the mold-board and share of a plow showing the blade applied; and Fig. 6 is a perspective view of a modified form of the blade.

Corresponding and like parts are referred to in the following description and indicated in all the views of the accompanying drawing by the same reference characters.

The blade consists of a body portion 1 having a forward cutting edge 2. At its inner end the body portion 1 merges into a shank 3 which is twisted slightly with relation to the body portion 1, the axis of the twist being approximately midway between the side edges of the shank 3. The inner end of the shank 3 terminates in an angularly disposed lug 4, and the shank 3 is provided with a perforation 5 through which a securing bolt, indicated at 6, is adapted to be passed. Cleats 7 are secured to the rear side of the share, mold-board or point of the plow in the usual manner, and the shank portion 3 of the blade fits against the rear side of one of the cleats. The lug 4 extends along the edge of the cleat. When the bolt 6 is passed through the cleat, plow point and blade, the blade is securely held in position upon the cleat with its cutting edge 2 approximately horizontal when the point, share or mold-board is inserted in the soil. When the blades are so positioned upon the share, moldboard or point of a plow, and as the said share, moldboard or point moves through the soil, the cutting edges 2 of the blades will operate at the surface of the soil or just below the same and will cut out the weeds or plants which are growing in close proximity to the plants which constitute the crop.

Figure 6:
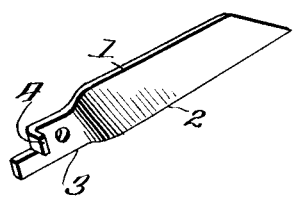

In the modified form of blade as illustrated in Fig. 6 a portion only of the inner end of the shank 3 is angularly disposed with relation to the shank forming the lug 4. This leaves a part of the extremity of the shank in the same plane with the major portion or body of the shank, and this extended end portion may receive the blows from a hammer or other tool in order to pitch the blade 2 at a desired angle with relation to the plow body or plate. That is to say, the lug 4 contains approximately just enough metal to hold the blade in position after it has been set, and by striking down upon the inner end of the shank 3 the blade may be turned upon the bolt 6 and the lug 4 by being brought forcibly against the edge of the cleat 7 is slightly distorted from its original disposition with relation to the body of the shank 3.

Having thus described the invention, what is claimed as new is:

In combination with a plow body having at its rear side a cleat, a blade having a shank bent at an angle to the blade and with its medial line forming a continuation of the medial line of the blade, a right angled extension formed at the free end of the shank, a second extension formed at the free end of the shank and forming a continuation of the same and projecting beyond the right angled extension, and a bolt passed through the cleat and the shank and holding the shank against the rear face of the cleat with its right angled extension against the edge of the cleat.

In testimony whereof we affix our signatures in presence of two witnesses.

JOHN H. KELLY. [L. S.]
JOHN H. MERSHON. [L. S.]

Witnesses for Kelly:
F. O. AIKEN,
J. A. HARRIS.

Witnesses for Mershon:
J. J. HENDERSON,
T. EMERSON.

Copies of this patent may be obtained for five cents each, by addressing the "Commissioner of Patents, Washington, D. C."